Aug. 18, 1959    H. F. HAWKINS ET AL    2,899,711
METHOD FOR MOLDING TENNIS BALLS

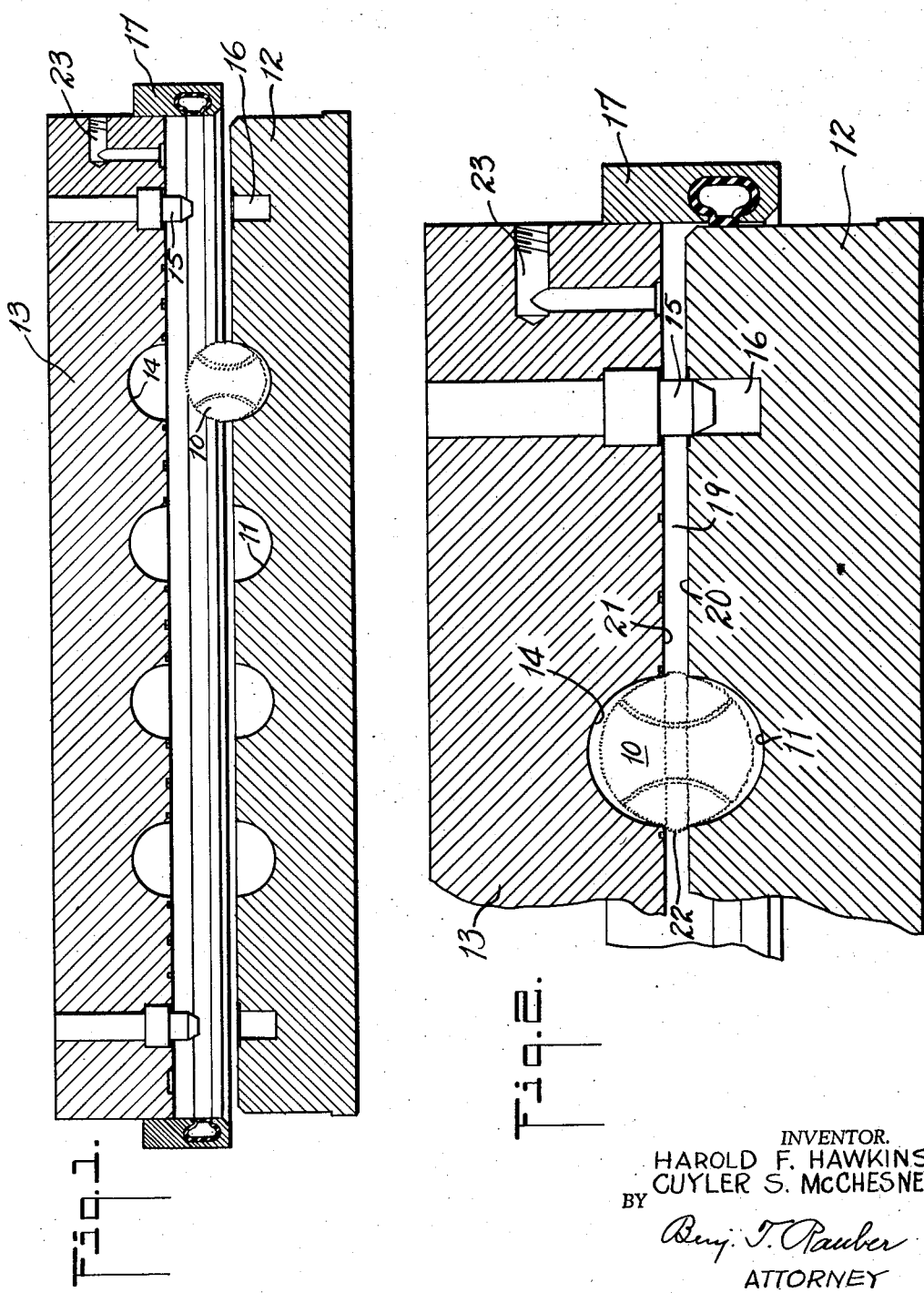

Filed June 14, 1957    2 Sheets-Sheet 2

INVENTOR.
HAROLD F. HAWKINS
CUYLER S. McCHESNEY
BY
*Benj. T. Rauber*
ATTORNEY

United States Patent Office 2,899,711
Patented Aug. 18, 1959

2,899,711

METHOD FOR MOLDING TENNIS BALLS

Harold F. Hawkins, Lockport, and Cuyler S. McChesney, Kenmore, N.Y., assignors to Dunlop Tire and Rubber Corporation, Buffalo, N.Y., a corporation of New York Application June 14, 1957, Serial No. 665,735

2 Claims. (Cl. 18—55)

Our invention relates to a method for molding tennis balls and similar articles.

Tennis balls inflated by air or other gas under pressure are covered by a fibrous felt covering and molded in a press having complementary, separable mold parts having hemispherical mold recesses. The felt covered ball is placed in a recess of one mold part, the other mold part is then placed and locked in position and the mold heated, the pneumatic pressure within the ball pressing the fibrous covering into contact with the inner surface of the mold recesses or cavities. The fibrous covering before molding is spongy and when the ball is placed into the cavity of one mold part, some of the fibrous material is left above and spreading slightly beyond the edge of the cavity. As the cavity of the other mold part is brought to complementary position some fibrous material is also left beyond its edge. These protruding parts are consequently caught between the non-cavity faces of the mold and form a flange-like equator about the ball which impairs its appearance and the uniformity of its wind resistance.

In our invention this effect is avoided and a tennis ball is obtained of a smooth spherical shape without any equator of felt. In my invention the ball to be molded is contracted slightly by external air pressure before being placed into the mold cavity to such a size that it is smaller than the cavity and may be placed in the cavity without leaving any projecting flange. The mold is then closed and the external pressure released. The ball then expands to tight contact with the cavity surface and is molded by heat.

Figure 3:
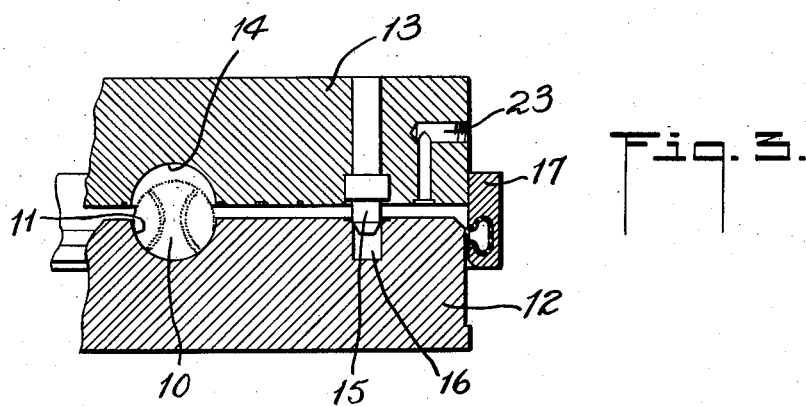
Figure 4:
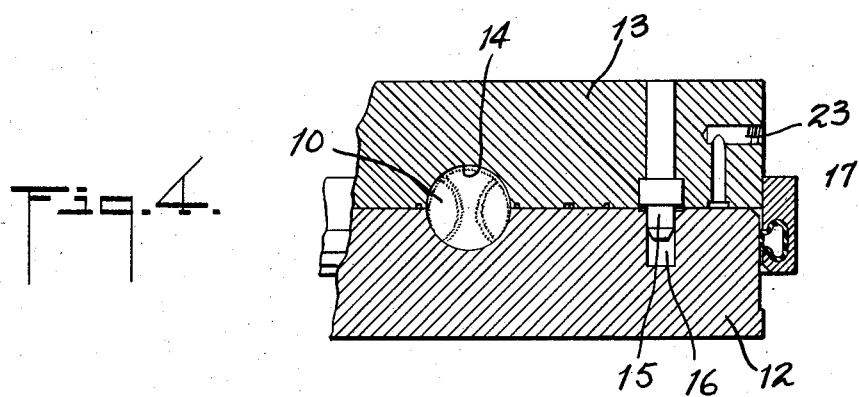
Figure 5:
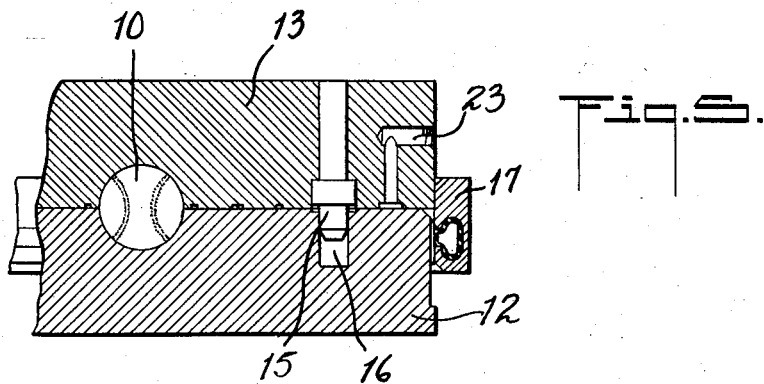

The various features of our invention are illustrated by way of example in the accompanying drawings, in which:

Fig. 1 is a vertical section of a pair of separated mold parts embodying our invention and having a number of mold cavities, a tennis ball to be molded being shown as placed in one of the cavities, Fig. 2 is a vertical section of a part of the mold parts advanced toward closing position and in position to apply pneumatic pressure to the space between the mold parts and to the ball, Fig. 3 is a similar section showing the size and position of the ball after applying pneumatic pressure to the exterior of the ball, Fig. 4 is a similar section showing the position of the ball and mold parts in closed position and, Fig. 5 is a similar section showing the mold parts closed and the penumatic pressure removed from the outside of the ball.

In the position of the parts shown in Fig. 1, a ball 10 is placed in a hemispherical cavity 11 of a lower mold part, the ball, being slightly larger in its unmolded state than the mold cavity, resting on the upper edge of the cavity. An upper mold part 13 has mold cavities 14 immediately above the mold cavities 11 of the lower part. It also has pins 15 extending downwardly to fit into recesses 16 in the lower mold part to ensure accurate complementary alignment of the upper and lower cavities 11 and 14. In the position shown in Fig. 1 the ball 10 is under atmospheric pressure.

The upper mold part 13 is provided with a peripheral downwardly extending flange 17 which, in the position of the parts shown in Fig. 1, is above the upper edge of the lower mold part 12. The inner face of the flange 17 closely fits the periphery of the lower mold part 12 and is provided with an inner recess in which is fitted an inflatable gasket 18. As the upper mold part 13 is lowered to the position shown in Fig. 2, the flange 17 encircles the periphery of the lower mold part 12 and, as the gasket is inflated, it seals against the periphery of the lower mold part and encloses air-tightly a space between the upper surface 20 of the lower mold part and the lower surface 21 of the upper mold part. As shown in this figure an equator portion 22 of the surface of the ball is caught between the surfaces 20 and 21.

After the mold parts have reached the positions shown in Fig. 2, air or other gas under greater pressure than that within the ball is introduced into the space 19 through a passage 23 in the upper mold part. This pressure applied to the exterior of the ball shrinks or compresses it as indicated in Fig. 3 to a size that it may fit loosely in the assembled mold cavities with no equator portion extending between the surfaces 19 and 20. The mold parts may then be brought together completely closing the mold cavities. The pressure on the external surface of the ball is then withdrawn by exhausting the pressure air or gas through the passage 23. The ball then expands to fill the mold cavity as shown in Fig. 5 and may be molded by heating the mold. It will be understood that all of the mold cavities 11 may be filled with balls to be molded as shown with the single cavity illustrated and the invention may be applied to other articles to which it may be applicable.

Having described our invention, what we claim is:

1. A method of molding hollow articles which comprises applying gaseous pressure to the exterior of the article to be molded to reduce its dimensions below the dimensions of the mold cavity, placing the article within one mold cavity, closing the cavity, releasing the pressure on the exterior of the article and molding the article.

2. A method of molding an inflated ball which comprises applying a gaseous pressure to the exterior of the ball to compress it to a diameter less than that of a mold cavity, placing said compressed ball in a mold cavity, closing the mold cavity, releasing the external gaseous pressure on the ball and molding the ball in the closed mold by heating it to a molding temperature.

References Cited in the file of this patent

UNITED STATES PATENTS

| | | |
|---|---|---|
| Re. 14,604 | Roberts | Mar. 4, 1919 |
| 1,877,673 | Law | Sept. 13, 1932 |
| 2,000,452 | McChesney | May 7, 1935 |
| 2,370,322 | Nebasar | Feb. 27, 1945 |
| 2,559,564 | Sperling | July 3, 1951 |
| 2,575,734 | Schulman | Nov. 20, 1951 |
| 2,760,233 | Bjorksten | Aug. 28, 1956 |